United States Patent [19]

Hackett

[11] 4,190,219

[45] Feb. 26, 1980

[54] VORTEX DIFFUSER

[75] Inventor: James E. Hackett, Smyrna, Ga.

[73] Assignee: Lockheed Corporation, Burbank, Calif.

[21] Appl. No.: 797,788

[22] Filed: May 17, 1977

[51] Int. Cl.$^2$ ............................................. B64C 5/08
[52] U.S. Cl. ..................................... 244/199; 244/91
[58] Field of Search ................... 244/199, 91, 13, 15, 244/130, 87

[56] References Cited

U.S. PATENT DOCUMENTS

| D. 140,113 | 1/1945 | Biasell | 244/13 |
|---|---|---|---|
| 2,326,819 | 8/1943 | Berlin | 244/87 |
| 2,576,981 | 12/1951 | Vogt | 244/199 |
| 2,915,261 | 12/1959 | Wallis | 244/91 |

OTHER PUBLICATIONS

"Gulfstream III Analysis", Flight International, Dec. 4, 1976, pp. 1623-1624.
Scheimann et al., "Exploratory Investigation of Factors Affecting the Wing Tip Vortex," NASA TM 2516, Apr. 1972.

*Primary Examiner*—Galen L. Barefoot
*Attorney, Agent, or Firm*—John J. Sullivan

[57] ABSTRACT

The vortex system behind an aircraft is responsible for more than half of the aircraft drag in cruise flight and sometimes more in other flight conditions. The purpose of the vortex diffuser is to intercept the wing tip vortex just aft of the wing trailing edge, diffuse the trailing vorticity and thereby achieve a reduction in drag. To do this, an airfoil-shaped device is mounted on a trailing boom situated at or near to the wing tip. The airfoil is mounted above the boom at an angle inboard of the vertical. Its height is a percentage of wing semispan as is also the mean airfoil chord.

The aft-mounting feature permits greater drag reduction at high subsonic Mach number and the inboard vane cant provides significant structural relief. In addition to drag reduction by diffusing the wing tip vortex, some reduction in trailing vortex hazard is also obtained.

5 Claims, 7 Drawing Figures

VORTEX DIFFUSER

BACKGROUND OF THE INVENTION

This invention relates broadly to devices to control vortex flow on and around the lift surfaces of aircraft, and more particularly to a vortex diffusion device to reduce drag due to such vortex flow during cruise, including cruise in the high subsonic speed regime of the aircraft where compressibility effects, notably those of locally supersonic flows, are a primary consideration.

Vortex flow around the aircraft lift surfaces or wings is particularly strong during take-off and landing, and remains sufficiently strong to contribute approximately 50% to cruise drag. Considerable effort has heretofore been devoted to dissipating such vortex flow during the cruise regime without undue emphasis on the take-off and landing flight regimes. However, a vortex dissipator which is designed for cruise may be even more effective at other times.

THE PRIOR ART

In prior attempts to optimize the efficiency of wings such devices as wing tip end plates and splitters have been proposed. In essence these earlier proposed devices are designed and intended to break large vortices down into multiple smaller vortices and thereby minimize their effects, not only on induced drag but also on trailing aircraft.

More recently and most pertinent to the present invention are the devices disclosed in and contemplated by the following U.S. Pat. Nos.:

2,576,981 issued to Richard Vogt on Dec. 4, 1951
2,743,888 issued to Alexander M. Lippisch on May 1, 1956
3,270,988 issued to Clarence C. Cone, Jr., on Sept. 6, 1966
3,712,564 issued to Scott C. Rethorst on Jan. 23, 1973

The devices of each of the above patents are similar to each other and to some extent try to simulate nature by initating a bird's wing tip. Thus surfaces are employed which shed separate vortices from a number of fingerlike wing tips deployed somewhat as by birds. These devices are all integral parts of the wing and constitute flow mechanisms which affect the formation of the trailing vortex which is never permitted to organize as a single entity. The intent is to shed the multiple vortices and thereby reduce the kinetic energy in the wake of the wing and lessening the induced drag thereon.

SUMMARY OF THE INVENTION

The present invention proposes to improve on the foregoing prior art and to that end contemplates a device which trails the wing to act upon the vortex after its initial formation.

This means that some concentration of vorticity is permitted to occur prior to breaking up the trailing vortex; the device is retrofittable to existing wings; and the device has minimal impact on wing design and aerodynamics both in overall and detailed aspects.

It has been found that by locating the diffuser entirely aft of the wing as herein proposed a degree of vortex roll-up is permitted upstream of the device which inherently permits greater thrust recovery for a device of given size. This is beneficial in the trade-off against skin friction. At the same time the wing pressure distribution is affected very little, which can be very important for fine-tuned wings, designed for high subsonic cruise with supersonic flow regions along part of the chord.

Since so called "winglets" proposed by Dr. Richard T. Whitcomb of the National Aeronautics and Space Administration (See Presentation on CONCEPTS FOR AIRCRAFT DRAG REDUCTION, presented at AGARD/VKI entitled "Methods for Reducing Subsonic Drag Due to Lift") have received considerable attention and publicity over the past few years, it is appropriate to point out important differences between these and the device herein proposed. Winglets are mounted along the wing tip chord where they act during the formative stage of the wing tip vortex whereas the instant device being mounted aft of the wing acts upon a more mature vortex. This aft mounting of the present diffuser allows for a comparatively less complex aerodynamic configuration. Also, such aftmounting, as herein proposed does not compromise wing tip flow development and "corner flow" problems, which have lead to compressible flow problems in winglet tests at high speed, cannot arise.

Moreover, winglets are required to be canted outwardly of the associated wing and thus tax the wing at its root giving rise to added structural considerations. With the inward canting of the diffuser as herein required there is an accompanying inherent wing root bending moment relief property.

Generally, the present invention envisions the disposition of a vane having an airfoil shaped cross-section secured to a boom of streamlined configuration adjacent the outer end of each fixed airplane wing. The entire vane is located aft and extends above the upper surface of the trailing edge of the associated wing with an inward cant of specific degree determined by the wing dihedral or anhedral and by wing bending considerations. The boom axis aligns with the local mainstream and the maximum dimension of the boom is such as to remain below the wing crest.

The vane sizing is determined by the weight, structural and performance characteristics of the particular airplane, being typically about 10% of the wing semispan. Its shape is generally rectangular with a span approximately four times its chord and a sweep related to the cruise speed of the airplane.

With the above and other objects in view as will be apparent this invention consists in the construction, combination and arrangement of parts all as hereinafter more clearly described, claimed and illustrated in the accompanying drawings.

IN THE DRAWINGS

Figure 1:
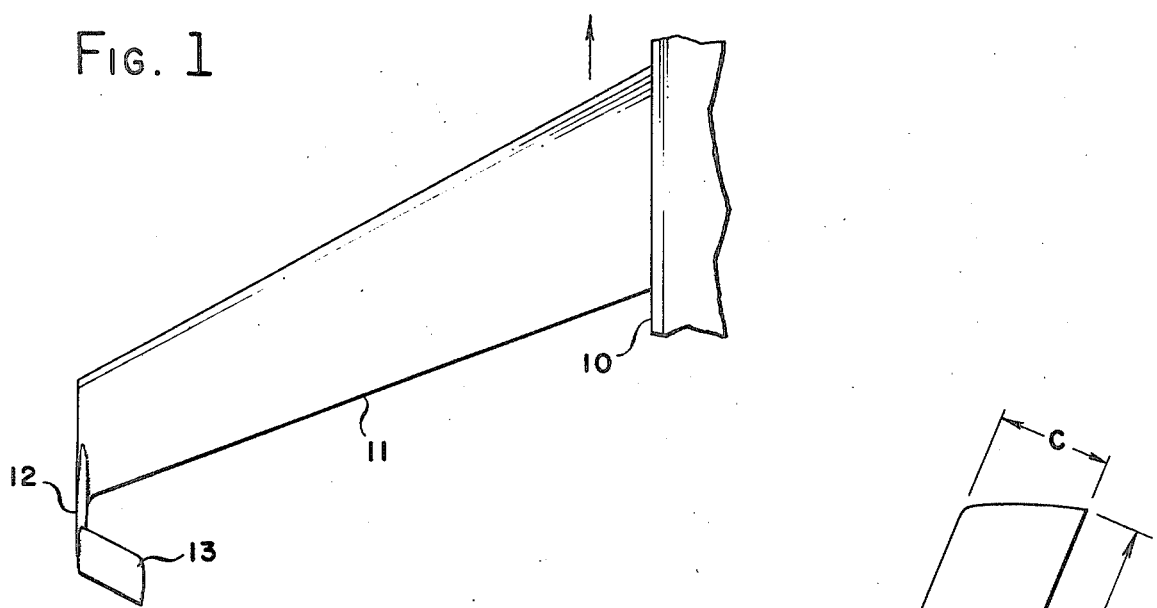
FIG. 1 is a plan view of a typical, swept back, fixed airplane wing modified to include a vortex diffuser, designed and constructed in accordance with the teachings hereof, attached to the outer tip thereof to show primarily the relative location of the vane and its supporting boom, only a portion of the airplane structure adjacent the wing being shown.
Figure 3:
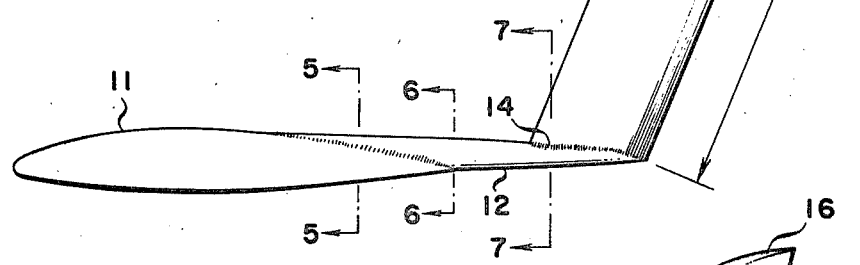
FIG. 3 is a side view of the wing of FIG. 1, i.e., a view looking inboard to show the organization and relative size of the vortex diffuser vane.
Figure 4:
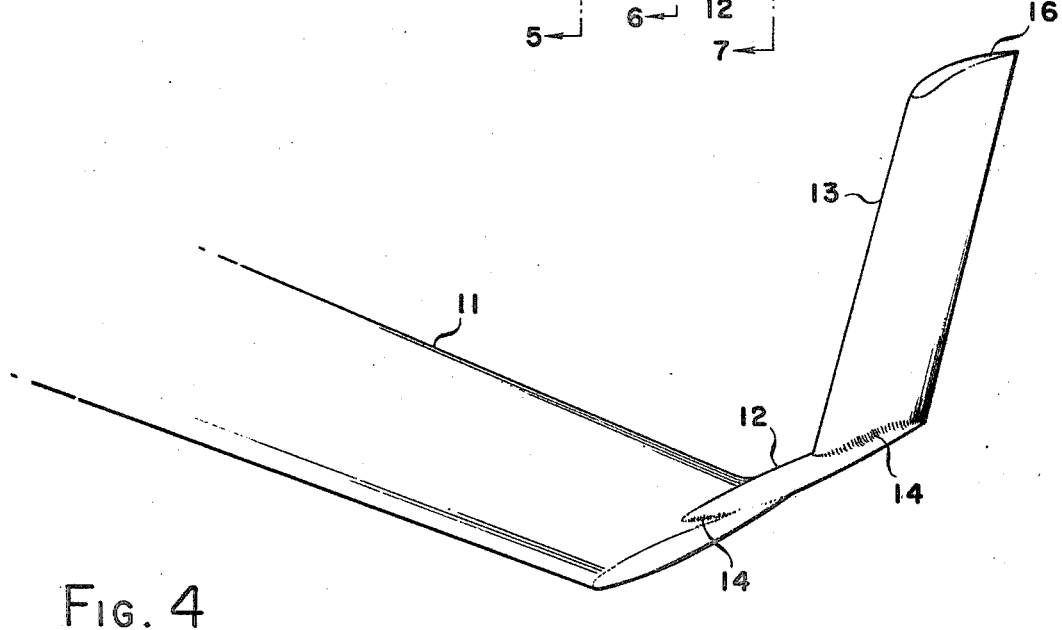
Figure 2:
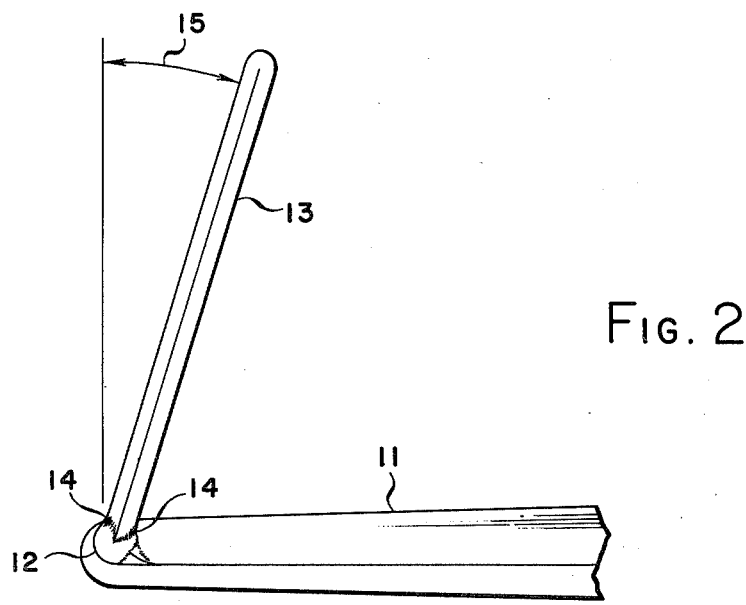
FIG. 2 is a view taken from the rear of the wing of FIG. 1 looking forward to show primarily the inward cant of the vane of the instant vortex diffuser.
Figure 5:
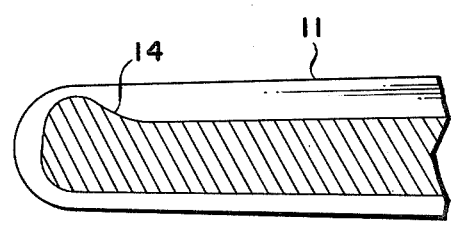
Figure 6:
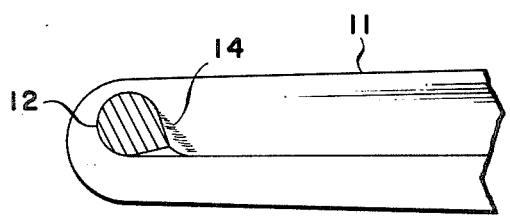
Figure 7:
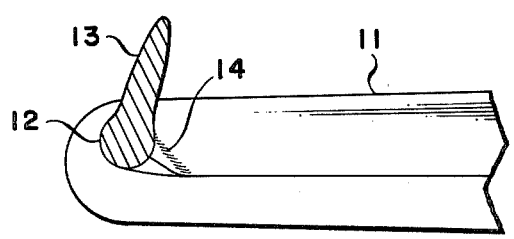

FIG. 4 is a perspective view of the outer wing end taken from the front and above to show primarily the profile configuration of the vortex diffuser vane; and FIGS. 5, 6 and 7 are sections taken along line 5—5, 6—6 and 7—7 respectively of FIG. 3 to show primarily the fillets employed between the vane and the boom of the vortex diffuser and between the boom and the associated wing.

Referring more particularly to the drawings 10 designates one side of an airplane fuselage to which a wing 11 is secured in conventional manner so as to extend outwardly therefrom. For purposes of illustration and a clearer understanding of the invention the wing 11 is depicted as swept-back with the direction of flight of the airplane being indicated by an arrow. The degree of sweep of the wing 11, as is customary, is determined by the cruise speed of the airplane.

Proximate its outer end the wing 11 is provided with a diffuser to attenuate vortex flow emanating from the wing 11 during cruise of the airplane. This vortex diffuser consists of an aft extending boom 12 preferably located adjacent the wing tip and a generally vertically disposed vane 13 projecting upwardly from this boom 12. Both intersections of the boom 12 with the wing 11 and vane 13 with the boom 12 are faired, as at 14, following conventional practice to minimize drag effect. For this purpose a fillet material, preferably fiberglass although other synthetics or metal as is customary, is employed.

The boom 12 is configured with a streamlined body having a transverse dimension such that the forward facing area of the wing tip is not increased thereby. The longitudinal axis of the boom 12 is aligned with the local mainstream. Preferably the boom 12 is secured to the upper surface of the wing 11 with its forward end proximate the wing mid-chord but aft of the wing crest.

The vane 13 is located entirely aft of the wing 11 wing the leading edge thereof at, and preferably spaced from, the trailing edge of the wing 11. While in some cases the vane 13 may be virtually vertical, i.e., perpendicular to the wing centerline 14, it is preferably canted inboard at an angle 15 on the order of 15° to 20°. Such angle 15 is determined by the particular wing geometry and structure and the need to provide wing root bending relief. By "wing geometry" it is intended to cover not only size and shape but angle, i.e., cathedral or dihedral as well. The vane 13 is also swept back corresponding to the wing 11.

The length L of the vane 13 from the boom 12 outward is in the range of 5% to 15% of the span of the associated wing 11. The chord length C of the vane 13 is approximately one fourth of the vane length L. As indicated in FIG. 4 the vane 13 is cambered as at 16 towards its leading edge so as to intercept the vortex flow smoothly and prevent separation.

For purposes of simplicity and a clearer understanding of the invention the wing 11, boom 12, vane 13 and fairing 14 are shown in FIGS. 5, 6 and 7 as an integral structure. In reality, each of these components would in all probability be separate units interconnected in conventional manner. In addition, the boom 12 and vane 13 would preferably be hollow or tubular in keeping with conventional aeronautic design practices.

While the invention has been hereinabove illustrated and described in what is believed to be its best and most practical form under present-day conditions, it is recognized that under other conditions this form would be modified. No attempt has been made to specifically incorporate any of such other forms in this disclosure in the interest of clarity of the total inventive concept. The claims are relied upon to cover these other forms generally.

What is claimed is:

1. A vortex diffuser to attenuate vortex flow after its formation and emanation from an airplane wing, such diffuser consisting of an aerodynamically configured boom secured to and extending aftwardly from said wing adjacent the outer tip thereof, and a single asymmetric vane secured to one side of said boom adjacent the aft end thereof and located entirely aft of said wing, said vane extending upward from said one side of said boom in a generally vertical direction and disposed in the path of said vortex flow, being cambered toward its leading edge so as to intercept said vortex flow smoothly and prevent the separation thereof.

2. The vortex diffuser of claim 1 wherein said boom is located at the outer wing tip aforesaid and has a transverse dimension such that the forward facing area of said wing tip is not increased thereby.

3. The vortex diffuser of claim 2 wherein said boom is mounted on the upper surface of said wing with its forward end proximate the wing mid-chord.

4. The vortex diffuser of claim 1 wherein said vane is generally rectangular having a length in the range of 5% to 15% of the span of said wing and a chord approximately ¼ of the vane length aforesaid.

5. The vortex diffuser of claim 1 wherein said vane is canted inboard at an angle on the order of 15° to 20° to the perpendicular of the centerline of said wing.

* * * * *